United States Patent [19]

Faure

[11] Patent Number: 5,476,529
[45] Date of Patent: Dec. 19, 1995

[54] PROCESS FOR THE RECOVERY OF MAGNESIUM FROM MAGNESIUM ALLOYS WASTE

[75] Inventor: Pierre Faure, Annecy, France

[73] Assignee: Pechiney Electrometallurgie, Paris, France

[21] Appl. No.: 348,140

[22] Filed: Nov. 23, 1994

[30] Foreign Application Priority Data

Nov. 30, 1993 [FR] France .................................. 93 14560

[51] Int. Cl.$^6$ .................................................. C22B 26/22
[52] U.S. Cl. ...................... 75/10.33; 75/10.32; 75/10.46; 75/10.47; 75/10.48; 75/10.5; 75/10.54; 75/10.55; 420/580; 420/590
[58] Field of Search ..................... 75/10.33, 594, 75/595, 10.32, 10.46, 10.47, 10.48, 10.5, 10.54, 10.55; 420/580, 590

[56] References Cited

U.S. PATENT DOCUMENTS

| | | |
|---|---|---|
| 1,913,929 | 6/1933 | Kerschbaum . |
| 1,955,964 | 4/1934 | Kemmer . |
| 2,787,592 | 4/1957 | Burkhardt . |
| 2,843,473 | 7/1958 | Colbry et al. . |
| 2,971,833 | 2/1961 | Artu et al. . |
| 4,695,319 | 9/1987 | Miura et al. ............................ 75/10.33 |
| 5,167,700 | 12/1992 | Wallevik et al. .......................... 75/595 |

FOREIGN PATENT DOCUMENTS

| | | |
|---|---|---|
| 701125 | 3/1931 | France . |
| 1194556 | 11/1959 | France . |
| 664737 | 8/1938 | Germany . |

OTHER PUBLICATIONS

*Metal Progress* 1978 Databook Jun. 1978 pp. 104–105.

Primary Examiner—Melvyn Andrews
Attorney, Agent, or Firm—Dennison, Meserole, Pollack & Scheiner

[57] ABSTRACT

A process for recovery of magnesium from magnesium alloy waste by charging an electric furnace with a flux including at least one salt, the flux being inert with respect to magnesium and having a melting point <1000° C. The flux is raised by the Joule effect at a reduced pressure to a temperature of 900° to 1100° C. to produce a bath having a density higher than that of magnesium, a vapor pressure <0.1 torr and an electrical resistivity of between 1 and 10 milliohm.m. The magnesium alloy waste is introduced in the bath, and magnesium and any other elements in the waste which are more volatile than magnesium are recovered from a vapor phase above the bath. Any elements in the waste which are less volatile than magnesium are recovered from a molten phase in a bottom portion of the furnace.

13 Claims, No Drawings

PROCESS FOR THE RECOVERY OF MAGNESIUM FROM MAGNESIUM ALLOYS WASTE

TECHNICAL FIELD

The invention concerns an industrial process for the recovery of magnesium from waste and scrap essentially formed by magnesium alloys.

PRIOR ART

Developments in the use of magnesium alloys, in particular for the production of cast components, results in the presence on the market of appreciable amounts of alloys waste and scrap which it is an attractive proposition to recover.

Hitherto such waste has been in most cases recycled in uses which do not require a high level of purity of the metal, such as for example desulphurisation of forge pig iron. On the other hand retreating the alloys waste to obtain pure magnesium which is intended for higher-quality uses is a more delicate operation. It is then necessary to separate the magnesium from the other alloy elements and remove the impurities and oxides which are mixed therewith.

In regard to alloys which do not contain zinc, it is possible to separate the magnesium from the other elements by distillation, although the equipment on an industrial scale which involves the use of that principle has still to be designed. In contrast, for alloys containing zinc, which are most frequently used in foundry operations under pressure, the problem is much more difficult as zinc is more volatile than magnesium and no industrial solution exists at this time.

AIM OF THE INVENTION

The aim of the invention is to provide a simple, reliable, economically viable industrial process which uses tried and tested industrial equipment and which makes it possible to recover pure magnesium or magnesium in a sufficient state of purity to be used again for alloys, from alloys waste.

SUMMARY OF THE INVENTION

The invention concerns a process for the recovery of magnesium from magnesium alloys waste in which:
  the waste is introduced into an alternating current electric furnace in the presence of a flux formed by a salt or a mixture of salts which are inert with respect to magnesium and having a melting point <1000° C., which is raised by Joule effect and at reduced pressure to a temperature of between 900° and 1100° C., the bath of molten salts which is produced having a density higher than that of magnesium, a vapour pressure in respect of the constituents <0.1 torr and an electrical resistivity of between 1 and 10 milliohm.m, and
  the magnesium is recovered with, if appropriate, the elements which are more volatile than magnesium, in the form of vapour which is condensed, while the less volatile elements are recovered in the form of a molten residual alloy at the bottom of the furnace.

The salts used for the flux are preferably fluorides, in particular alkaline-earth fluorides. Mixtures which are particularly well suited to the process are eutectic mixtures of cryolite and magnesium fluoride or fluorides of barium and magnesium. The elements which are more volatile than magnesium, in particular zinc, are separated from the magnesium by condensation in stages.

For carrying the process according to the invention it is a particularly attractive proposition to use an installation which serves for the production of magnesium by electrothermal reduction of magnesia or dolomite.

In fact the applicants had the original idea of using, for the operation of re-melting the waste, the same installation as that which they use for the production of primary magnesium from dolomite and which carries into effect the process referred to the MAGNETHERM process which they developed some thirty years ago.

That process is described in terms of its basic principle by French patent No 1 194 556 (=U.S. Pat. No. 2,971,833). It uses a charge formed by calcined dolomite as the source of magnesium, ferrosilicon as a reducing agent and alumina in order to produce, at a temperature of between 1700° and 1750° C., magnesium vapour and a slag based on dicalcium silicate which serves as a resistor to maintain the reaction temperature by the Joule effect. The electric furnace is maintained under a reduced pressure and the magnesium vapour is condensed and then collected in the solid or liquid state in a cooled crucible.

In that process, it is possible to add to the charge a small amount of aluminium alloys waste without noticeably modifying the operating paremeters. On the other hand, if there is a wish to use exclusively alloys waste as the magnesium source, it is necessary to make profound modifications to the process, and these are the subject of the present invention.

DESCRIPTION OF THE INVENTION

The main modification concerns the nature of the slag which serves as a liquid resistor. The applicants had the idea of considerably lowering the working temperature to bring it into the range of 900°–100° C., which inter alia has the advantages of avoiding the risks of splashing phenomena due to the zinc, which could occur at higher temperature, and reducing the level of energy consumption and the amount of wear of the installation.

That change in working temperature led the applicants to choose as the flux a salt or a mixture of mineral salts which are inert with respect to the magnesium up to the working temperature, the melting point of which is lower than 1000° C. and in which the vapour pressure of the constituents is lower than 0.1 torr at the selected temperature. The bath of molten salts must also be capable of dissolving the oxides which are always present in the alloys waste.

Since the bath of molten salts, like the slag in the MAGNETHERM process, performs the function of a resistor, it is desirable for its resistivity to be high, between 1 and 10 milliohm.m, as the maximum current strength that the power supply of the furnace can deliver limits the power to $RI^2$. That constraint however is less severe than in the MAGNETHERM process as the power necessary to ensure a given production is lower, by virtue of the fact that less energy is needed to produce magnesium vapour from solid magnesium than from magnesia and silicon.

The magnesium alloys waste is preferably introduced into the bath of molten salts progressively and at a rate such that the temperature of the bath remains substantially constant and it is necessary for the density of the bath to be higher than that of the alloys wastes which are introduced into same in order to prevent them from falling to the bottom of the furnace, which would interfere with evaporation of the magnesium and greatly reduce the electrical resistance of the furnace.

Among the possible salts, fluorides are those which are most suitable, in particular alkaline-earth fluorides. A particularly attractive mixture is the mixture of magnesium fluoride-cryolite, in the vicinity of the eutectic, comprising from 77 to 85% (preferably 79 to 83%) by weight of cryolite $Na_3AlF_6$ and from 15 to 23% (preferably 17 to 21%) of $MgF_2$. It is possible to add to that mixture, in a total amount of less than 10% by weight, other salts such as fluorides of calcium or barium.

That mixture melts at 920° C., and is of a density of 2.0 at about 1100° C. and the vapour pressures of the different constituents of the bath including NaF and $AlF_3$ are lower than 0.1 torr. The resistivity at 1100° C. of the bath of salts which is obtained from that mixture is of the order of $5 \times 10^{-3}$ ohm.m, that is to say almost double that of the MAGNETHERM slag at 1750° C.

Another attractive mixture is the mixture $BaF_2$–$MgF_2$ in the vicinity of the eutectic, comprising from 77 to 85% by weight (preferably 79 to 83%) of $BaF_2$ and from 15 to 23% (preferably 17 to 21%) of $MgF_2$.

As the bath of salts is progressively charged with oxides, in particular MgO and $Al_2O_3$, at the end of a certain period of time it has to be regenerated. That operation can be effected in situ; the furnace is restored to atmospheric pressure, the copper electrode of the MAGNETHERM process is temporarily replaced by an amorphous carbon or graphite electrode and the salt bath is electrolysed with direct current so as to reduce the oxygen to $CO_2$. As soon as an incipient anode effect appears, normal operation of the waste treatment procedure is resumed.

The elements which are less volatile than magnesium such as Fe, Ti, Zr, Si and Al accumulate at the bottom of the furnace in a residual alloy which is discontinuously poured. The composition of that alloy has to be monitored and possibly corrected so that it is sufficiently fusible and so that carburation thereof by the carbon of the hearth of the furnace is prevented. Thus it may be an attractive proposition to add either iron or aluminium or silicon.

Condensation of the magnesium is effected in the same manner as in the processes for the electrothermal production of magnesium from oxidised ore. If elements which are more volatile than magnesium occur in the alloys waste, they are found with the magnesium again in the form of vapour. In order to provide for separation of the different elements, it is possible to effect condensation by stages of the vapour by means of condensers in a cascade arrangement operating at decreasing temperatures. That is in particular one of the ways of separating magnesium from zinc.

The installation used may be a conventional MAGNETHERM installation with a water-cooled metal electrode. The water can be replaced by other heat-exchange fluids.

EXAMPLES

Example 1

Using a furnace of MAGNETHERM type of an inside diameter of 0.85 m, fitted with an electrode of a diameter of 0.18 m, with an electrode-hearth distance of 0.30 m, to produce magnesium from a conventional charge of calcined dolomite, alumina and ferrosilicon, 14600 kWh/t was consumed for a power of 320 kW, obtained with a voltage of 52 V and a current of 6200 A.

Example 2

The furnace of Example 1 was emptied and re-charged with a flux formed by a mixture of 81% by weight of $BaF_2$ and 19% of $MgF_2$, the melting of point of which is 912° C., then fed with magnesium waste with 99% of Mg, in such a way that the temperature of the bath is maintained at 970° C.

With a supply voltage reduced to 39 V, the current strength passing into the furnace was 2500 A and the power consumed was 97 kW. The consumption of energy per tonne of magnesium purified to 99.8% produced was 4760 kWh/t.

Example 3

The same furnace was emptied and re-charged with a flux formed by a mixture of 81% by weight of cryolite and 19% of $MgF_2$. Waste formed in respect of two-thirds by weight by magnesium alloy AZ91 with 9% of aluminium and 1% of zinc and in respect of one-third by iron punchings was then introduced, the operation of charging that waste into the furnace being effected at a rate such that the temperature of the bath is maintained at 1000° C.

The vapours emitted by the furnace were directed onto a primary condenser maintained at a temperature of 670° C. where liquid magnesium in a state of 99.8% of purity with less than 0.1% of zinc was collected. Interposed between the primary condenser and the vacuum pump was a second condenser cooled to 25° C., for recovery of the zinc. A residual alloy of ferroaluminium with 13.8% of aluminium was recovered at the base of the furnace.

The consumption of energy was 5340 kWh/t of Mg recovered.

I claim:

1. A process for recovery of magnesium from magnesium alloy waste, comprising the steps of:

a) charging an electric furnace with a flux comprising at least one salt, said flux being inert with respect to magnesium and having a melting point <1000° C., and raising the flux by Joule effect at reduced pressure to a temperature of 900° to 1100° C. to produce a bath having a density higher than that of magnesium, a vapor pressure of <0.1 torr and an electrical resistivity of between 1 and 10 milliohm.m;

b) introducing into the bath said magnesium alloy waste;

c) recovering from a vapor phase above the bath magnesium and any other elements in said magnesium alloy waste which are more volatile than magnesium; and d) recovering any elements in said magnesium alloy waste which are less volatile than magnesium from a molten phase in a bottom portion of the furnace.

2. A process according to claim 1, wherein the flux comprises a fluoride or a mixture of fluorides.

3. A process according to claim 2, wherein the flux comprises a mixture of cryolite and magnesium fluoride.

4. A process according to claim 3, wherein the mixture comprises from 77 to 85% by weight of cryolite and from 15 to 23% of magnesium fluoride.

5. A process according to claim 3 wherein fluorides of calcium and/or barium are added to the mixture, in a total quantity of said calcium and/or barium fluorides less than 10% of the mixture.

6. A process according to claim 2, wherein the flux comprises a mixture of fluorides of barium and magnesium.

7. A process according to claim 6, wherein the mixture is formed by 77 to 85% by weight of barium fluoride and from 15 to 23% of magnesium fluoride.

8. A process according to claim 1 additionally comprising refining the flux in situ by electrolysis with direct current by means of an amorphous carbon or graphite electrode.

9. A process according to claim 1 wherein the magnesium alloys waste is introduced into the bath of molten salts while keeping the bath temperature constant.

10. A process according to claim 1 wherein the composition of the residual alloy recovered at the bottom portion of the furnace is modified by adding to the magnesium alloy waste at least one of the elements selected from the group consisting of iron, aluminum and silicon.

11. A process according to claim 1 additionally comprising condensing the magnesium vapor in liquid form.

12. A process according to claim 1 additionally comprising separating the magnesium vapor from the other more volatile elements by condensation in stages. production of primary magnesium by electrothermal reduction of an oxidised ore is used.

13. A process according to claim 1 wherein said furnace uses a cooled metal electrode, cooled by a heat-exchange fluid other than water.

* * * * *